United States Patent Office 3,734,877
Patented May 22, 1973

3,734,877
FLAME RETARDANT COMPOSITION
George Christie, Jr., Loudonville, N.Y., assignor to General Electric Company
No Drawing. Filed June 17, 1971, Ser. No. 154,185
Int. Cl. C08g 51/04
U.S. Cl. 260—37 SB
11 Claims

ABSTRACT OF THE DISCLOSURE

A silicone elastomer stock which exhibits improved flame resistance in the cured state consists essentially of a silicone elastomer, a filler and a small amount of a platinum compound in combination with triphenyl phosphite.

BACKGROUND OF THE INVENTION

This invention relates to organopolysiloxane compositions having improved flame retardant properties. More particularly, this invention is concerned with a composition of matter which, in the cured state, exhibits improved flame retardant properties and which comprises (1) an organopolysiloxane gum convertible to the cured, solid, elastic state and consisting essentially of silicon atoms, oxygen atoms and organic groups selected from the class consisting of methyl radicals, aromatic radicals selected from the class consisting of aryl and halogenated aryl radicals, vinyl radicals, lower alkyl radicals, lower cyanoalkyl radicals and lower haloalkyl radicals, (2) a finely divided inorganic filler, (3) a platinum compound or platinum and (4) an organo phosphite, the organo radicals of which are selected from the same group as the organo radicals of the organopolysiloxane.

A method for improving the flame retardancy of a silicone rubber is shown in U.S. Pat. 3,514,424, Noble et al., where a platinum compound or platinum is combined with other components of a silicone rubber to impart flame retardancy. While the addition of platinum or platinum compound does improve the flame retardancy of silicone rubbers and is entirely adequate for most uses, the rubbers produced according to the Noble et al. patent are not as flame retardant as might be desired in low phenyl, high methyl rubbers and in rubbers made in plants having a high sulfur content in the atmosphere.

SUMMARY OF THE INVENTION

In accordance with the present invention, it has been discovered that by incorporating a small amount of an organo phosphite in combination with a platinum compound or platinum in a filled silicone rubber composition that the flame retardancy of the silicone rubber is markedly improved, especially in rubbers having a high methyl, low phenyl content and rubbers made in the presence of sulfur in the atmosphere surrounding the rubber manufacturing equipment.

DESCRIPTION OF THE PREFERRED EMBODIMENTS

The organopolysiloxane which is convertible to the cured, solid, elastic state can be any of the organopolysiloxane gums known in the art which fall within the composition range stated above and have a penetration of 50 to 10,000. The penetration is measured in 0.1 mm./min. using A.S.T.M. Standard Test No. D–217–60 T with a modified plunger or foot. The plunger or foot utilized to measure the penetration of the organopolysiloxane gums described in this application consists of a cylinder ¼″ in diameter and 3/16″ long formed of brass and attached to a shaft of steel having a diameter of ⅛″ and a length of approximately 5⅛″. This plunger weighs approximately 9.1 g. For purposes of the test, a 100 g. load is placed on the shaft. The penetration is the rate at which the modified plunger or foot sinks into the silicone gum.

These organopolysiloxanes are advantageously obtained by condensing a diorganodihydrolyzable silane, for example, dimethyldichlorosilane with or without small amounts of monoorganotrihydrolyzable silanes or triorganomonohydrolyzable silanes, for example, methyltrichlorosilane, trimethylchlorosilane, etc., and thereafter effecting condensation of the hydrolysis product using a condensing agent, for instance, an alkaline condensing agent, such as potassium hydroxide, sodium hydroxide, etc., or an acidic condensing agent, such as ferric chloride, etc. Alternately, cyclic polymers of dimethylsiloxane can be condensed with an alkaline condensing agent to give the desired organopolysiloxane which is convertible to the cured, solid, elastic state. Whatever the method of formulation of the convertible organopolysiloxane, the final material can contain up to 35 mole percent of phenyl radicals bonded by silicon-carbon links and up to 2% of vinyl radicals bonded through silicon-carbon links. Thus, when the convertible material is formed by hydrolysis a portion of the starting material can be diphenyldihydrolyzable silane, methylphenyldihydrolyzable silane, methylvinyldihydrolyzable silane, divinyldihydrolyzable silane, etc., or the monoorganotrihydrolyzable or triorganomonohydrolyzable silanes containing these radicals.

It is essential to the production of truly flame retardant compositions that a quantity of a filler be present. In general, any filler system which is residually non-alkaline, i.e., acid or neutral, can be employed. Any of the finely divided silica fillers generally used for silicone rubber, such as silica aerogel, fumed silica, ground quartz, and finely divided silica treated with organosilicon materials, e.g., trimethylchlorosilane, etc., can be employed. The treatment of silica fillers with organosilicon materials are as described, e.g., in U.S. Pats. 2,938,009—Lucas and 3,004,859—Lichtenwalner. The amount of filler present can vary within wide ranges, from 10 to 300 parts of filler per 100 parts of the organopolysiloxane gum. Preferably, the filler is present in an amount of from 40 to 125 parts per 100 parts of the organopolysiloxane gum. Up to about ⅔ of the total silica filler can be replaced by such materials as carbon black, titanium dioxide, zinc oxide, or diatomaceous earth, or a combination of these materials, so long as a residual alkalinity in the filler system does not result. However, while clay has often been employed as a filler for silicone rubber, it has unexpectedly been found that convertible organopolysiloxane materials filled with alkaline clay, alone, do not exhibit the flame retardancy shown by the materials filled with a finely divided silica or a mixture of silica with one or more of the other materials mentioned previously.

Any of the residually non-alkaline metal oxides of Group II may be used to replace the filler in whole or in part. The preferable filler replacement material is zinc oxide.

The platinum-containing material which is used is, as previously mentioned, any of the materials generally utilized in SiH+Si-olefin reactions. Among the forms of this platinum are elemental platinum as shown in U.S. Pat. 2,970,150—Bailey and platinum-on-charcoal, platinum-on-gamma-alumina, platinum-on-silica gel, platinum-on-asbestos, and chloroplatinic acid, $$(H_2PtCl_6 \cdot 6H_2O)$$

as mentioned in Pat. 2,823,218—Speier. Further, the platinum-containing material can be selected from those having the formula 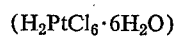 $(PtCl_2 \cdot olefin)_2$ and $H(PtCl_3 \cdot olefin)$, as described in U.S. Pat. 3,159,601—Ashby. The olefin shown in the previous two formulas can be almost any type of olefin, but is preferably an alkene having from 2 to 8 carbon atoms, a cycloalkene having from 5 to 7 carbon atoms or styrene. Specific olefins utilizable in the above formulas are ethylene, propylene, the various isomers of butylene, octylene, cyclopentene, cyclohexene, cycloheptene, etc. A further platinum-containing material usable in the composition of the present invention is the platinum chloride cyclopropane complex $(PtCl_2 \cdot C_3H_6)_2$ described in U.S. Pat. 3,159,662—Ashby.

Still further, the platinum-containing material can be a complex formed from chloroplatinic acid with up to 2 moles per gram of platinum of a member selected from the class consisting of alcohols, ethers, aldehydes and mixtures of the above as described in U.S. Pat. 3,220,972—Lamoreaux.

The preferred platinum compound to be used as a flame retardant additive is that disclosed in Franch Pat. 1,548,775 of Karstedt. Generally speaking, this type of platinum complex is formed by reacting chloroplatinic acid containing 4 molecules of water of hydration with tetramethyl-tetravinylcyclotetrasiloxane in the presence of sodium bicarbonate in an ethanol solution.

A large number of other platinum compounds, including complexes which are conventionally and generally widely known in the field, of SiH-olefin addition reactions are also useful in the practice of the present invention.

Small but effective amounts of the platinum compound are sufficient to impart the desired flame retardancy to the silicone rubber. In general, amounts of from less than 1 to more than 250 parts per million as platinum based on the organopolysiloxane gum can be used. Preferably, the amount is from less than 1 p.p.m. to about 25 p.p.m. as platinum based on the organopolysiloxane gum. When the gum is a methyl and phenyl-containing gum, it is preferable that less than 1 p.p.m. of platinum be used in order to prevent damage due to heat aging of the final product.

The platinum or platinum compound can be employed in amounts greater than 250 parts per million but due to the cost of the materials, utilization of greater than 250 p.p.m. is not preferred as the increased amounts do not provide significant improvement in the flame retardancy of the final material.

It is particularly surprising that the presence of an organo phosphite should be found in conjunction with the platinum or platinum compound to enhance the flame retardancy imparted by the platinum or platinum compound to silicone rubber. Tricresyl phosphate, a known flame retardant, in combination with a platinum or a platinum compound in the same application does not enhance the flame retardancy of the final silicone rubber composition.

The organo phosphites which may be employed in the practice of the present invention include the known phosphite flame retardants such as the trialkyl and tri(haloalkyl) and the corresponding dialkyl and dihaloalkyl phosphites, for example, trimethyl phosphite, triethyl phosphite, tris(2-chloroethyl) phosphite, trisisopropyl phosphite, tributyl phosphite, tris(2-ethylhexyl) phosphite, trisisooctyl phosphite, dimethyl hydrogen phosphite $(CH_3O)_2P(O)H$, diethyl hydrogen phosphite $(C_2H_5O)_2P(O)H$, dibutyl hydrogen phosphite $(C_4H_9O)_2P(O)H$, and bis(2-ethylhexyl) hydrogen phosphite $(C_8H_{17}O)_2P(O)H$; triaryl and tri(haloaryl) and the corresponding bisaryl and bishaloaryl phosphites such as tris(2-methylphenyl) phosphite, trinaphthyl phosphite, tris(3-propyl) phosphite, bis(2-propylphenyl) hydrogen phosphite and bis(2-bromophenyl), tris(2-chlorophenyl) phosphite, hydrogen phosphite; bis and tris alkenyl phosphites such as trivinyl phosphite, triallyl phosphite, tris(1-pentenyl) phosphite and divinyl hydrogen phosphite. The preferred organo phosphites are the triaryl phosphites with the most preferred being tri-phenyl phosphite. The amounts of organo phosphite to be added is not critical though there is an optimum range. The organo phosphite is preferably added in an amount of from about 0.001 to 1.0 part per hundred parts based upon 100 parts of gum. The amount, however, can vary from a small but effective amount to enhance flame retardancy to about 10.0 parts per 100 parts of gum. The upper limit is governed to a large degree by cost consideration.

While the previously described organopolysiloxane gum, silica filler or combination of silica filler with others of the enumerated fillers, platinum-containing material and organo phosphite are essential to the production of the flame retardant silicone rubber composition, other materials can be added without impairing this flame retardant property. Some of these additional materials may even enhance the flame retardancy. Among the additional materials which can be added are rubber process aids, such as alkoxy-containing, hydrocarbon-substituted polysiloxane fluids as described in U.S. Pat. 2,954,357—Feketc and hydroxylated silanes as described in U.S. Pat. 2,890,188—Konkle et al. Additionally, resinous organopolysiloxane materials such as those formed from tetrafunctional alkyl-silicates, triorganomonofunctional silanes, and, in some cases, difunctional diorganosilanes, as disclosed and claimed in U.S. Pat. 2,857,356—Goodwin, Jr., can also be employed.

The order of addition of the various components to the composition is immaterial. All can be added simultaneously or the organo phosphite and filler, the platinum compound or platinum and additional materials when they are present can be added at varying times to the organopolysiloxane gum and a homogeneous blend obtained. Following blending of the various materials, the material is cured using any of various curing agents as, for example, benzoyl peroxide, tertiary butyl perbenzoate, bis-(2,4-dichlorobenzoyl)peroxide, etc. These curing agents can be present in varying amounts ranging from about 0.3% to as high as 6 to 10% by weight, or more, based on the weight of the organopolysiloxane gum. Further, the convertible organopolysiloxane gum can be cured by any other method known in the art without adversely affecting the flame retardant properties imparted by the filler and platinum-containing material. Cure is accomplished with the various peroxide and perbenzoate catalysts by heating with slight pressure at from about 100° C. to 200° C. for times ranging from 5 to 15 minutes. In addition to, or instead of this press cure, the silicone rubber composition can be treated at temperatures of from about 200° C. to 500° C. for sufficient time to assure complete conversion of the polysiloxane gum to a substantially infusible and insoluble state.

The process of the present invention will now be more fully illustrated. These illustrations should not be considered as limiting in any way the full scope of the present invention as covered in the appended claims.

The platinum compound which was used to impart flame retardancy in the rubbers produced in the following examples was produced by the following procedure. Into a reaction vessel was placed 74 parts of tetravinyl-tetramethylcyclotetrasiloxane, 4.5 parts of sodium bicarbonate and the reaction vesel was purged with nitrogen gas for 15 minutes and a nitrogen blanket was maintained over the reaction mixture throughout the process. Then, 3.7 parts of chloroplatinic acid containing 4 molecules of water of hydration and 17.8 parts of ethanol were added. The mixture was slowly heated to 55° C. with vigorous agitation and held at 55° C. for 30 to 45 minutes. The mixture was then refluxed for 15 to 30 minutes. The platinum compound which formed was then vacuum stripped, filtered and dissolved in 9 parts of a vinyl chain-stopped polydimethylsiloxane having a viscosity of 10 centistokes.

Example 1

A flame retardant silicone rubber was prepared by blending two compounded gums with the flame retardant additive of the present invention. The following gums, except for the designated amounts of phenyl and vinyl, were substituted with methyl groups. For all practical purposes there were two organo groups on each silicon atom except the terminal silicon atoms which contained three organo groups. All organo groups other than phenyl and vinyl were methyl groups.

The first compounded gum was prepared by blending 34 parts of a gum having a penetration of 1000 and containing 1/½ mole percent phenyl groups, 62.5 parts of a vinyl chain-stopped gum having a penetration of 1500 and containing 2 and ½ mole percent phenyl groups, 3.5 parts of a gum having a penetration of 3000 and containing 13½ mole percent vinyl groups, 0.4 part of vinyl triethoxysilane, 2 parts of hexamethyldisilazane, 0.3 part of rare earth octoate, 11 parts of a methoxy-stopped polydimethylsiloxane having a viscosity of 10 centistokes, 40 parts of fumed silica having a surface area of 200 square meters per gram, 5 parts of diatomaceous earth and 0.9 part of water. The composition was thoroughly mixed.

The second compounded gum was prepared by mixing 55.7 parts of a vinyl chain-stopped gum having a penetration of 650, 39.8 parts of a gum having a penetration of 950, 4.5 parts of an oil having a viscosity of 100 centistokes and containing 7 mole percent vinyl groups, 0.25 part of rare earth octoate, 3 parts of a methoxy-stopped polydimethylsiloxane having a viscosity of 10 centistokes, 4 parts of a silanol-stopped fluid having a viscosity of 40 centistokes, 0.02 part of hexamethyldisilazane and 50.4 parts of fumed silica having a surface area of 200 square meters per gram. This mixture was cooked for 6 hours at 170° C. and thoroughly mixed.

A flame retardant rubber was prepared by mixing 60 parts of the first described compounded gum, 40 parts of the second described compounded gum, 5 parts of diatomaceous earth, 5 parts of titanium dioxide, 1 part of the platinum compound solution described above, and 1.5 parts of a 50% by weight solution of dichlorobenzoyl peroxide in silicone oil. The mixture was divided into three portions. To the first portion was added 0.05 part per hundred parts of compounded gum of triphenyl phosphite; to the second portion was added 0.025 part per hundred parts of compounded gum of triphenyl phosphite and no triphenyl phosphite was added to the third portion—this was used as a control. The compounded gums were pressed into sheets 70 millimeters thick and cured in a press for 15 minutes at 260° F. The sheets were then post cured for 4 hours at 325° F. All three sheets had a Shore A Hardness of about 54, a tensile of about 1100 p.s.i. elongation of about 510%, a tear of about 157 in. with triphenyl phosphite and about 137 in. without triphenyl phosphite, each had a specific gravity of 1.24. The flame retardant properties of the three sheets were determined by hanging 3" squares of the sheets edgewise ¾" above a Bunson burner top and a 1½" high flame for 12 seconds after which the extinguishing time in seconds was recorded. The fraction containing 0.05 part of triphenyl phosphite in 5 runs had extinguishing times of 5, 3, 1, 5.5, and 13 seconds. The fraction containing 0.025 part of triphenyl phosphite had extinguishing times of 3.5, 15, 3.5, 6.5 and 12 seconds and the control had extinguishing times of 25.5, 28.0, 38.0 and 21.0 seconds.

Example 2

The following example employs a gum having a higher phenyl content than Example 1. It will be noted that the effect of the triphenyl phosphite is less pronounced in this type of a gum than it is in the gum which has a higher methyl content, though the effect is still pronounced.

The compounded gum used in the composition was made by mixing 47 parts of a gum having a penetration of 700 and containing 0.05 mole percent vinyl and 5.0 mole percent phenyl as diphenylsiloxy units and being vinyl chain-stopped, 48.5 parts of a gum having a penetration of 700 and containing 5.0 mole percent phenyl as diphenylsiloxy units, 4.5 parts of a gum containing 13 and one-half mole percent vinyl groups and having a penetration of 5000, 5 parts of octamethylcyclotetrasiloxane, 0.45 part of distilled water, 3 parts of a methoxy-stopped polydimethylsiloxane having a viscosity of 10 centistokes, 4 parts of a silanol-stopped fluid having a viscosity of 40 centistokes, 2 parts of hexamethyldisilazane and 45 parts of fumed silica having a surface area of 200 square meters per gram.

To 100 parts of the above compounded gum was added 1 part of the catalyst compound solution, 0.4 part of magnesium oxide, 0.05 part of triphenyl phosphite, 0.1 part of titanium dioxide, and 1½ parts of a 50% by weight solution of 2,4-dichlorobenzoyl peroxide in silicone oil. The composition was press cured into 70 mil thick sheets for 15 minutes at 260° F., and then post cured for 4 hours at 400° F. The sheets were subjected to the same flame test as outlined in Example 1 and the burn time was about 7 seconds. Example 2 was repeated with 0.01, 0.02 part, 0.1 part and 0.2 part of triphenyl phosphite instead of the 0.05 part with approximately the same burn time. The composition prepared by the teaching of Example 2 without triphenyl phosphite had an average burn time of about 12 seconds. Air frame seals were made using the rubber composition described in Example 2 and tested under simulated flight conditions and were found to be quite effective under high temperature flame containing conditions.

While the foregoing examples have of necessity been directed only to a few of the composition variables which are practicable in the practice of the present invention, it should be understood, however, that many other variables are within the scope of the present invention. The gums into which the synergistic flame retardant composition is added are not by necessity limited only to those specifically enumerated in the examples and may include all of the gums commonly used in the manufacture of silicone rubber. These gums include cyanoalkyl-substituted polysiloxanes and fluoroalkyl-substituted poliysiloxanes, among others. In the above examples "vinyl stopped," "silanol-stopped," etc. refer to the terminal groups on the polysiloxane. The terminal group contains the group the polymer is stopped with attached to a dimethylsiloxy unit, e.g., "vinyl stopped" refers to a polydiorganosiloxane containing vinyl dimethylsiloxy terminal units.

Having thus described the invention, what I desire to secure and claim by U.S. Letters Patents is:

1. A composition of matter which, in a cured state exhibits improved flame-retardant properties, the composition comprising:
   (1) 100 parts of an organopolysiloxane gum convertible to the cured, solid, elastic state and consisting essentially of silicon atoms, oxygen atoms, and organic groups selected from the class consisting of methyl radical, aromatic radicals selected from the class consisting of aryl and halogenated aryl radicals in an amount of from 0 to 35 mole percent of the total organic groups of vinyl radicals, there being from 1.98 to 2.05 organic groups per silicon atom,
   (2) a finely divided, non-alkaline inorganic filler in an amount of from 10 to 300 parts, by weight,
   (3) small, but effective amount to impart flame retardancy of a platinum containing material not exceeding 250 parts per million by weight based on the organopolysiloxane gum, and
   (4) a small but effective amount of organophosphite not exceeding about 10 parts per 100 parts by weight of organopolysiloxane gum to improve flame retardancy, said organophosphite being at least one selected from the group consisting of
      (a) trialkyl and tri(haloalkyl)phosphites,
      (b) dialkyl and dihaloalkylphosphites,
      (c) triaryl and tris(haloaryl)phosphites, and
      (d) bis and tris-alkenylphosphites.

2. The cured product of claim 1.

3. The composition of claim 1 further characterized by the inorganic filler being present in an amount of from 40 to 125 parts.

4. The composition of claim 1 further characterized by the platinum-containing material being present in a range to provide from about 1 to about 25 parts per million, by weight based on the organopolysiloxane gum, of platinum.

5. The composition of claim 1 further characterized by the organo phosphite being a triaryl phosphite.

6. The composition of claim 1 further characterized by the organo phosphite being selected from the group consisting of aryl phosphites, haloaryl phosphites, alkyl phosphites and haloalkyl phosphites.

7. The composition of claim 1 further characterized by the inorganic filler being fumed silica and the organo phosphite being triphenyl phosphite.

8. The composition of claim 7 further characterized by the triphenyl phosphite being present in an amount of from 0.001 to 1.0 part.

9. A composition of matter which in a cured state exhibits improved flame-retardant properties, the composition comprising:
  (1) 100 parts of an organopolysiloxane gum convertible to the cured, solid, elastic state and consisting essentially of silicon atoms, oxygen atoms, and organic groups selected from the class consisting of methyl radicals, aromatic radicals selected from the class consisting of aryl and halogenated aryl radicals in an amount of from 0 to 35 mole percent of the organic groups, and from 0 to 2 mole percent of the total organic groups of vinyl radicals, there being from 1.98 to 2.05 organic groups per silicon atom,
  (2) small, but effective amount to impart flame retardancy of a platinum containing material not exceeding 250 parts per million by weight based on the organopolysiloxane gum,
  (3) a small, but effective amount of an organophosphite not exceeding about 10 parts per 100 parts by weight of organopolysiloxane gum to improve the flame retardancy of the above composition, said organophosphite being at least one selected from the group consisting of,
    (a) trialkyl and tri(haloalkyl)phosphites,
    (b) dialkyl and dihaloalkylphosphites,
    (c) triaryl and tris(haloaryl)phosphites, and
    (d) bis and tris-alkenylphosphites.

10. The composition of claim 9 further characterized by from about 0.001 to about 1.0 part of triphenyl phosphite being present.

11. The composition of claim 9 further characterized by about from 1 to about 25 parts per million of platinum compound, calculated as platinum, being present.

References Cited

UNITED STATES PATENTS

| | | | |
|---|---|---|---|
| 3,514,424 | 5/1970 | Noble et al. | 260—37 SB |
| 3,539,530 | 11/1970 | Karstedt | 260—46.5 UA X |
| 3,635,874 | 1/1972 | Laur et al. | 260—37 SB |

LEWIS T. JACOBS, Primary Examiner

U.S. Cl. X.R.

260—45.7 P, 45.75 R